April 22, 1924.
L. T. SMITH
1,491,109
HANDLE FOR OPERATING OIL LEVEL PET COCKS
Filed July 17, 1922
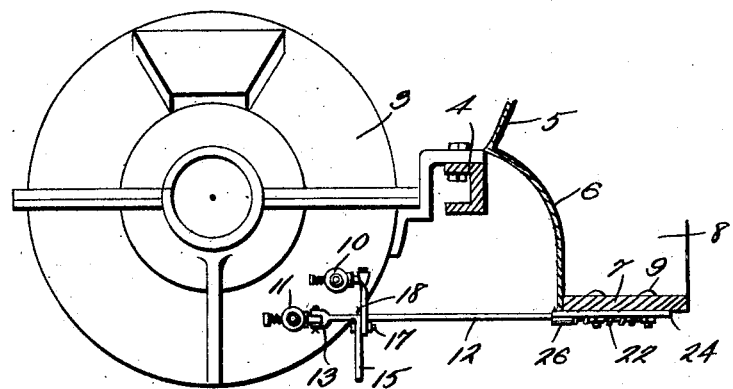
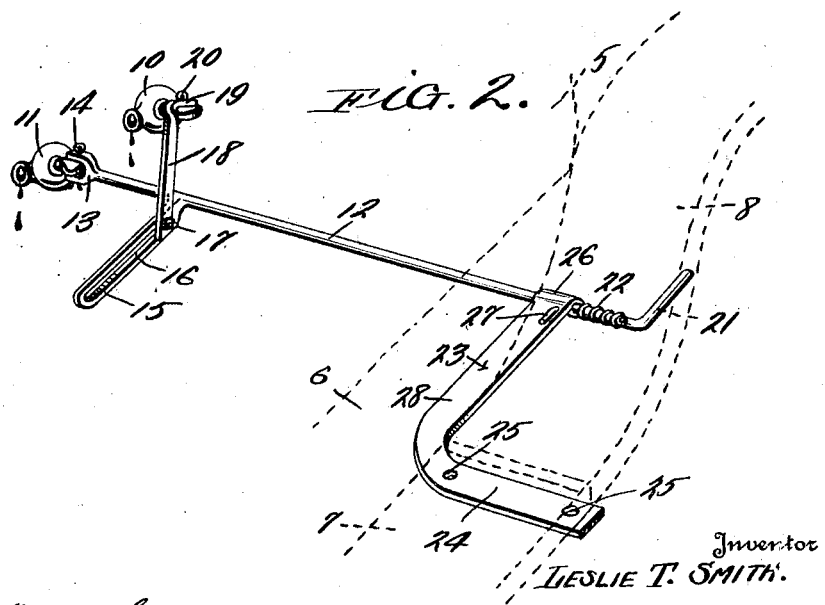
Inventor
LESLIE T. SMITH.
Witness
By Richard B. Owen
Attorney Patented Apr. 22, 1924.

1,491,109

UNITED STATES PATENT OFFICE.

LESLIE T. SMITH, OF McKINNEY, TEXAS.

HANDLE FOR OPERATING OIL-LEVEL PET COCKS.

Application filed July 17, 1922. Serial No. 575,697.

*To all whom it may concern:*

Be it known that I, LESLIE T. SMITH, a citizen of the United States, residing at McKinney, in the county of Collin and State of Texas, have invented certain new and useful Improvements in Handles for Operating Oil-Level Pet Cocks, of which the following is a specification.

This invention relates to new and useful improvements in devices for conveniently ascertaining the level of lubricating oil in automobile motor crank cases and has for its primary object the provision of means which eliminates the necessity of the driver of the automobile from crawling under the machine to open and close the crank case pet cocks for determining the amount of lubricating oil in the engine crank case.

Another important object of the invention resides in the provision of a device of this character having means which will automatically close the pet cocks so that the operator of the vehicle after opening the cocks can release the handle of the device and upon doing so will know that the means provided will automatically close the cocks and prevent oil in the crank case from draining out with the consequent damage done to the motor from running without lubricating oil.

Still another important object of the invention is to provide simple and inexpensive means for attaching the device to an automobile without altering in any way whatsoever the construction thereof and which will hold the device in a position to be arranged out of sight, and still in a convenient place to reach.

Other objects and advantages of the invention will become apparent during the course of the following description.

In the accompanying drawing forming a part of the description and wherein like numerals are employed to designate like parts throughout the several views.

Figure 1 is a fragmentary transverse section through an automobile with the device applied thereto, and Figure 2 is a perspective view of the invention showing its attachment to an automobile, the latter being shown in dotted lines.

Referring now more specifically to the drawing, and wherein for the purpose of illustration is shown the embodiment of the invention which is at present preferred, the numeral 3 designates the rear end of an automobile motor crank case of an automobile of a well known make which is supported in the conventional manner from the chassis 4 of the automobile. A part of the automobile body is designated by the numeral 5 and has depending therefrom at each side an apron 6, at the lower end of which is supported a running board 7 of the conventional type. A mud guard 8 has its rear end fastened to the forward end of the running board by a pair of bolts 9 in the conventional manner, and it will of course be understood that both sides of the vehicle are the same but only one side is illustrated to show the side of the automobile to which the device is applied.

As is well known, the rear end of the crank case 3 of automobiles of the type referred to herein is provided with a pair of oil level pet cocks 10 and 11. These cocks are arranged at different heights on the crank case, and are each provided with a handle for operating the valve thereof whereby the operator of the automobile can first open the upper cock 10 and if no oil drips therefrom, he will then open the lower cock 11 to ascertain if the oil level in the crank case is even with the lower cock. If it is not, he then knows that the supply of oil in the crank case should be immediately replenished. Often it happens that the attendant or service man at a service station or repair shop is requested by the driver of an automobile to ascertain if the automobile needs oil in the crank case, and the service man will open one or both of the pet cocks and being in a hurry will neglect to close the same, and permit the oil in the crank case to drain out without the knowledge of the driver. It is therefore one of the objects of my present invention to provide means whereby the pet cocks will be automatically closed to eliminate this danger.

The invention consists of an elongated rod or handle 12, the inner end of which is provided with a pet cock handle engaging socket in the form of a forked end 13. The handle of the lower pet cock is adapted to be received in the forked end of the handle after an opening has been drilled in the handle of the cock, and as each arm of the form is apertured and the apertures thereof are adapted to register with the one in the handle of the cock, a bolt or cotter pin 14 is passed through the aligned apertures of the fork and pet cock handle to secure the two together and prevent accidental displacement.

The rod or handle 12 is also provided with a flattened extension 15, which projects at right angles to the rod and is spaced a sufficient distance from the forked end 13 so as to be disposed beneath, or approximately so, the handle of the pet cock 10. This extension 15 is provided with a longitudinally extending slot 16 in which is loosely mounted for sliding movement therein a bolt 17 which is carried by the lower end of an arm 18, the upper end of which is first twisted and then bent to extend at right angles thereto as indicated by the numeral 19. This upper angularly disposed end 19 of the arm 18 is provided with an aperture to register with an aperture in the handle of pet cock 10, and a cotter pin 20, or any other suitable means such as a bolt is then passed through the registering apertures to fasten the angular end 19 of the arm to the handle of the cock.

The rod or handle 12 is adapted to extend transversely of the automobile and its free outer end is arranged beneath the right hand fender 8 of the automobile just in advance of the running board 7. The terminal 21 of this free end is bent at right angles to the rod as clearly seen in Fig. 2 to form a grip or handle for the rod. The rod adjacent this angularly disposed end is provided with an opening through which extends and is secured one end of a coil spring 22, the function of which is to retain and return the rod 12 to a position to close both pet cocks 10 and 11 when the operator releases hold on the handle 21.

This handle end of the rod is supported beneath the right hand front fender 8 of the automobile by means of a bracket 23, which assumes the form of an L-shaped bar, one arm 24 of which is approximately the same length as the running board 7 is wide, and is equipped with a pair of apertures 25 to align with the apertures in the mud guard and running board so that the ordinary bolts 9 securing the mud guard to the running board can be employed to attach the bracket 23 to the under side of the running board as shown. The other arm of the bracket extends longitudinally of the automobile body and its free end is bent to provide a sleeve 26 arranged transversely of the arm and in which a portion of the rod 12 just inside of the coil spring 22 is received and supported. The free end 27 of the coil spring 22 is passed through an aperture in the arm 28 of the bracket in order to normally urge the rod 12 to a predetermined position, that is to say with the handle 21 pointing rearwardly of the automobile so as not to become entangled with weeds and other obstructions. It will of course be understood that the inner forked end of the rod 12 is supported by the pet cock handle engaging element.

To assemble the device with an automobile, the bolts 9 which secure the rear end of the mud guard to the forward end of the running board are moved and the arm 24 of bracket 23 is positioned beneath the running board so that its apertures 25 align with those in the running board whereby the bolts 9 can be passed through these parts for attaching the bracket to the machine. The bracket is secured so that the other arm 28 of the bracket extends forwardly of the machine and so that the handle or rod 12 will be disposed so that its forked inner end 13 can be slipped over the handle of the lower pet cock 11. However, before associating the fork 13 with its respective pet cock, the handle 12 is given one turn to tension the spring 22 so that after the device has been associated with the pet cocks and the handle turned to open the same, and is released, the spring will automatically return the rod 12 to its normal position and close the valves of both cocks. After the forked end 13 has been secured to the handle of pet cock 11, and the cotter pin 14 passed through the same, the angular end 19 of the arm 18 is positioned so that the cotter pin 20 can be passed through the end 19 of the arm and the handle of pet cock 10. The device will then be attached to the automobile so that it will not rattle and the handle 21 will be disposed under the right hand mud guard and adjacent the forward edge of the running board so as to be within convenient reach of the operator. Normally, the handle 21 of the rod 12 extends rearwardly of the automobile, and when it is desired to ascertain the level of oil in the crank case the handle is grasped and turned downwardly and forwardly so that the valves of both pet cocks are simultaneously opened. As soon as the handle 21 is released, the coil spring 22 will cause the rod 12 to rotate to return the handle 22 to extend rearwardly of the vehicle and at the same time the slotted arm 15 of the rod will move vertically to cause the lower end of the arm 18 to slide on the free end of the link 15 while it is turning to close the valve of the upper cock 10. At the same time the rod 12 is turning to cause its forked end to close the valve of the lower cock 11. Therefore it will be seen that when the pet cocks are closed that the bolt 17 of arm 18 will be disposed in the relative outer end of the slotted link 15. When the handle 21 is turned to open the cocks, the bolt 17 of arm 18 slides through the slot 16 as the slotted arm 15 swings downwardly. At the same time the bolt is sliding in its slot, it is causing a pull on arm 18 for opening the valve of pet cock 10.

The foregoing description and accompanying drawing have reference to what might be considered the approved form of my invention. I desire it to be understood that I may make such changes in the construction, combination and arrangement of parts, materials, dimensions, et cetera, as may prove expedient and fall within the scope of the appended claims.

Having thus fully described my invention what I claim is:—

1. A device for operating oil level pet cocks including a rotatable operating rod having means at one end for engagement with a pet cock valve handle, and an arm pivotally and slidably associated with said rod and adapted for engagement with the valve handle of a second pet cock.

2. A device for operating oil level pet cocks including a rotatable operating rod having one end provided with means for engagement with the handle of a pet cock valve, a slotted extension on said rod, and an arm having one end slidably and pivotally associated with said slotted extension and having its opposite end angularly disposed for attachment to the valve handle of a second pet cock.

3. A device for operating oil level pet cocks including a rotatable operating rod having one end provided with a socket for engagement with the handle of a pet cock valve, a slotted finger extending from said rod at right angles thereto, and an operating arm having one end slidably and pivotally associated with said slotted finger and having its opposite end engaging the handle of a second pet cock valve.

In testimony whereof I affix my signature in presence of two witnesses.

LESLIE T. SMITH.

Witnesses:
A. B. HARRIS,
E. O. MOORE.